US00RE42938E

(19) United States
(12) Reissued Patent
Sipma et al.

(10) Patent Number: US RE42,938 E
(45) Date of Reissued Patent: Nov. 22, 2011

(54) APPARATUS FOR CUTTING AND STIRRING CURD

(75) Inventors: Sijmen Sipma, De Knipe (NL); Sjoerd Huitema, Koudum (NL)

(73) Assignee: Tetra Laval Holdings & Finance S.A., Pully (CH)

( * ) Notice: This patent is subject to a terminal disclaimer.

(21) Appl. No.: 10/821,280

(22) Filed: Apr. 9, 2004

Related U.S. Patent Documents

Reissue of:
(64) Patent No.: 6,367,375
Issued: Apr. 9, 2002
Appl. No.: 09/865,361
Filed: May 25, 2001

U.S. Applications:
(63) Continuation of application No. 09/659,994, filed on Sep. 12, 2000, now Pat. No. 6,257,129.

(30) Foreign Application Priority Data

Sep. 17, 1999 (NL) ..... 1013083

(51) Int. Cl.
*A23L 1/00* (2006.01)

(52) U.S. Cl. ..... 99/466; 99/452; 99/455; 99/459; 366/144; 366/149; 366/325.1

(58) Field of Classification Search ..... 99/348, 99/452–459, 460–466, 467, 473–478, 483; 366/144–149, 325.1, 300, 301, 328.2
See application file for complete search history.

(56) References Cited

U.S. PATENT DOCUMENTS

| | | | |
|---|---|---|---|
| 3,829,594 | A | 8/1974 | Schweizer |
| 3,858,855 | A | 1/1975 | Hazen |
| 4,093,419 | A | 6/1978 | Tauber |
| 4,108,058 | A | 8/1978 | Sjoholm et al. |
| 4,183,674 | A | 1/1980 | Sudo et al. |
| 4,791,735 | A | 12/1988 | Forberg |
| 4,989,504 | A | 2/1991 | Jay |
| 6,257,129 | B1 | 7/2001 | Sipma et al. |

*Primary Examiner* — Reginald L. Alexander
(74) *Attorney, Agent, or Firm* — Buchanan Ingersoll & Rooney PC

(57) ABSTRACT

Apparatus for cutting and stirring curd, comprising a curd vat with a shaft drivable for rotation, which shaft carries a number of cutting frames extending radially from the shaft and arranged on the shaft in staggered relation, each cutting frame having two frame girders, which extend radially from the drivable shaft and between which a lattice work is situated formed from longitudinal knives and transverse knives, the transverse knives being mounted on the frame girders by welding. The transverse knives form openings which are in line, in which the longitudinal knives are received with ample play, while means are provided for substantially preventing displacement of the longitudinal knives in the longitudinal direction.

19 Claims, 9 Drawing Sheets

Figure 6:
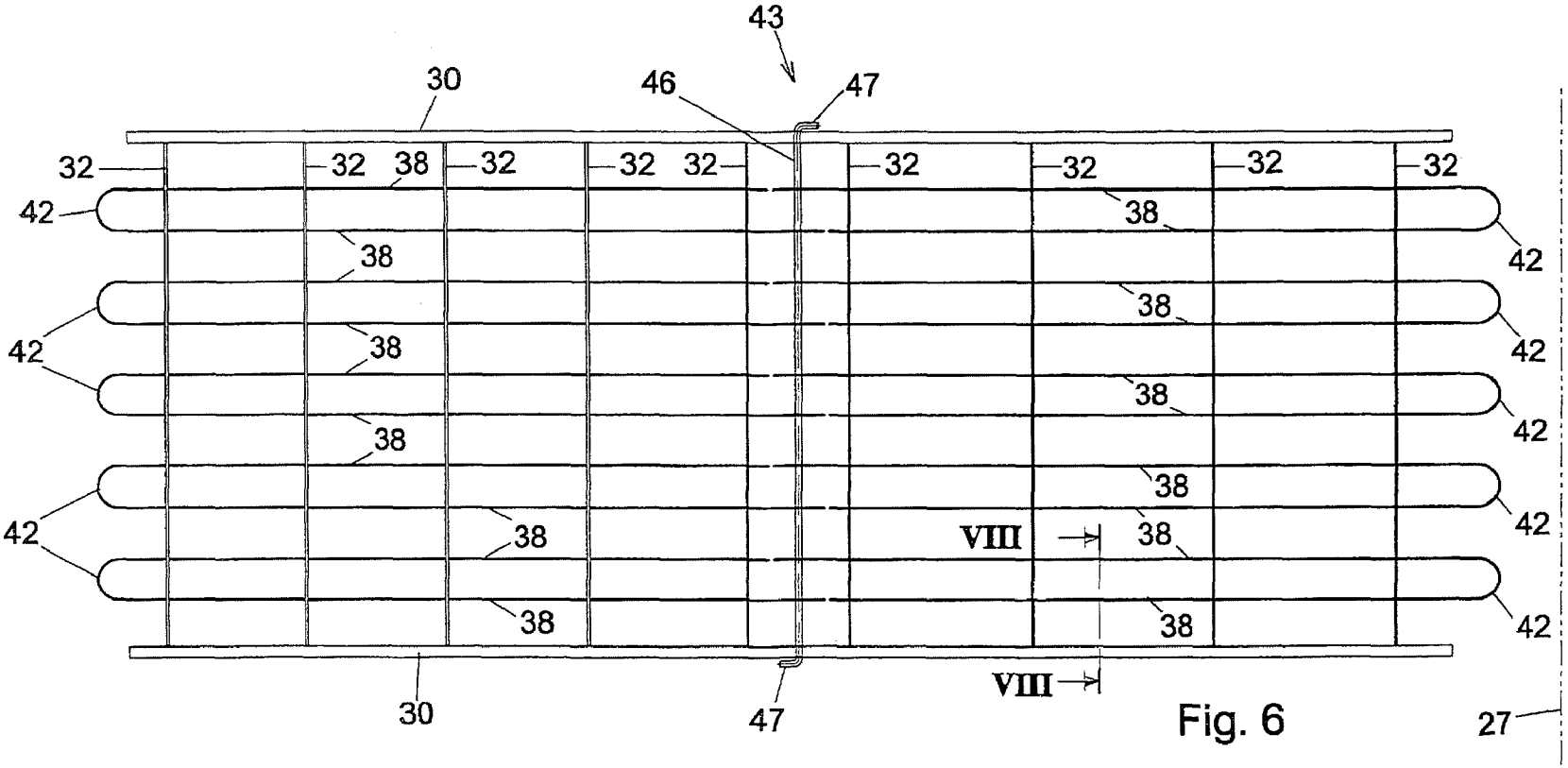

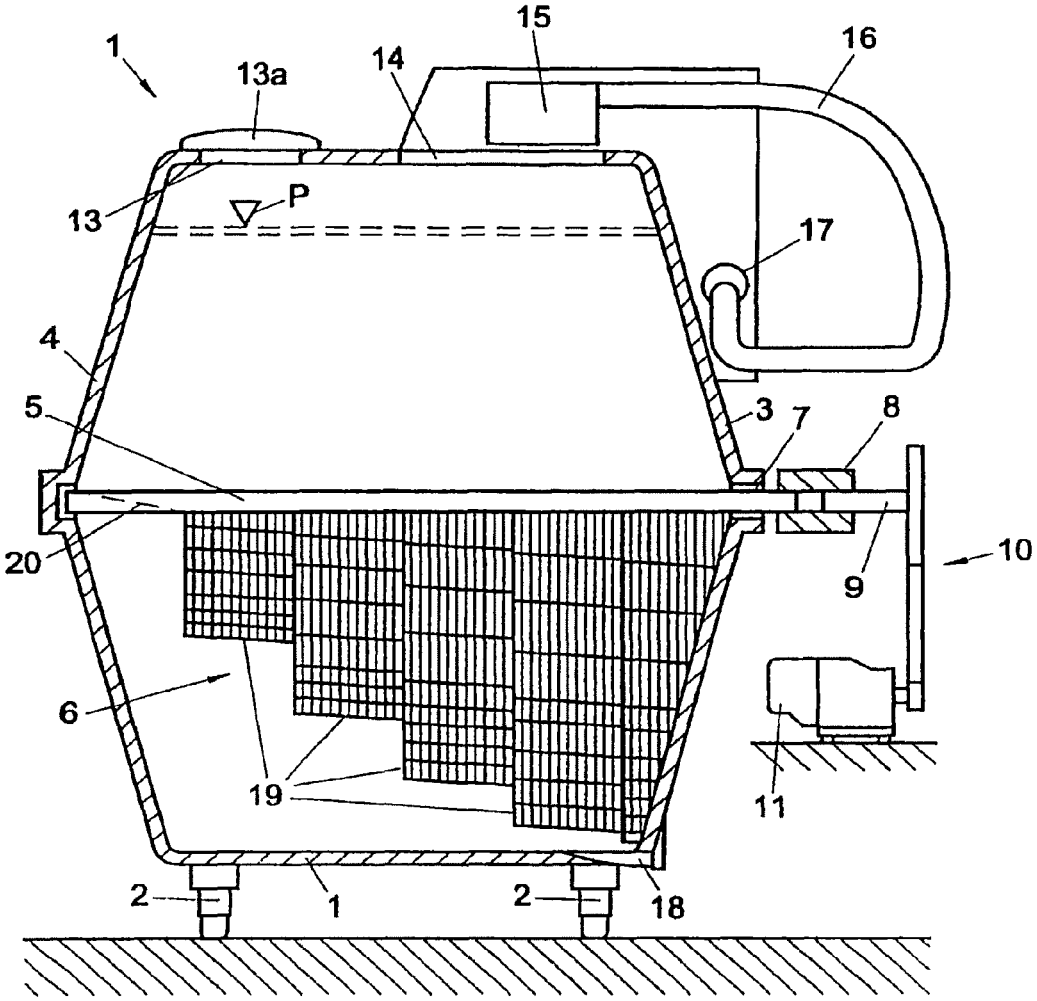
Fig. 1 (Prior Art)
Amended

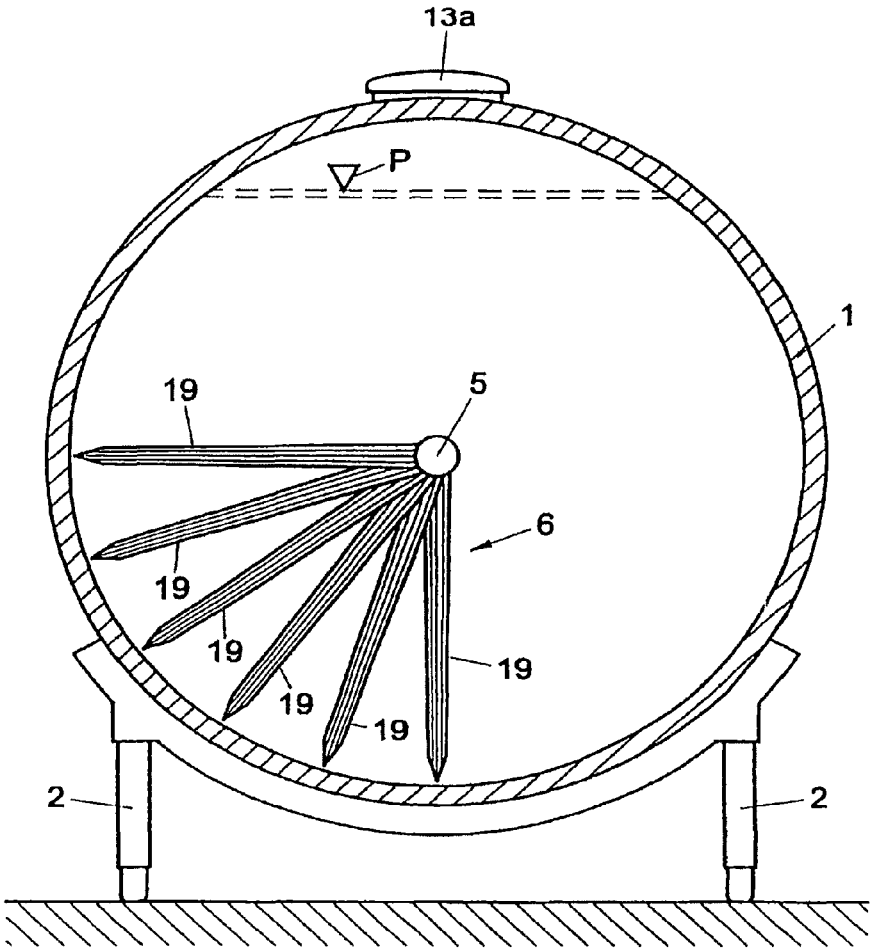
Fig. 2 (Prior Art)
Amended

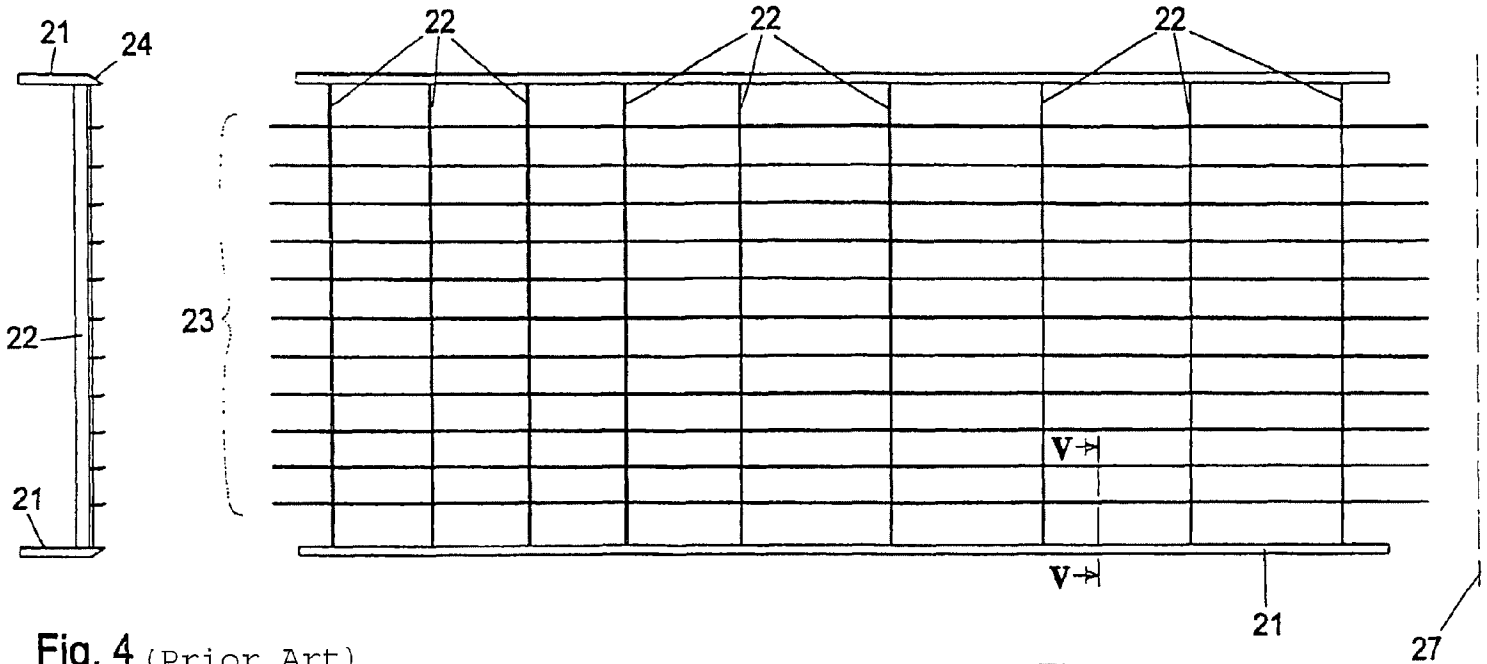
Fig. 3 (Prior Art)
Amended
Fig. 4 (Prior Art)
Amended
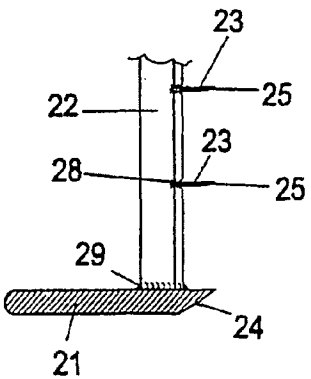
Fig. 5 (Prior Art)
Amended

APPARATUS FOR CUTTING AND STIRRING CURD

Matter enclosed in heavy brackets [ ] appears in the original patent but forms no part of this reissue specification; matter printed in italics indicates the additions made by reissue.

This application is a continuation of Ser. No. 09/659,994, filed Sep. 12, 2000, now U.S. Pat. No. 6,257,129.

This invention relates to an apparatus for cutting and stirring curd. Such apparatuses are known from practice and comprise a tank in which a rotatable shaft is situated which carries cutting frames extending radially from the shaft, which cutting frames are mounted on the shaft in staggered relation. The cutting frames each comprise two spaced-apart parallel frame girders, which are mounted by one end on the rotatable shaft and whose other end extends to a point near the wall of the tank. The tank can be arranged horizontally or vertically, the rotatable shaft then being likewise horizontal or vertical.

Arranged between the frame girders is a lattice of longitudinal and transverse knives. The transverse knives extend transversely to the frame girders and are welded to them. The longitudinal knives extend parallel to the frame girders and are mounted on the transverse knives by welding.

Such an apparatus is, for instance, the curd vat marketed by Tetra Pak Tebel under the name of OST4. Such an apparatus is also described, for instance, in U.S. Pat. No. 4,108,058. A variant with two horizontal shafts in a horizontal oval tank is described in U.S. Pat. No. 4,989,504.

All known apparatuses are arranged for stirring and cutting curd which has formed in the tank in that the tank has been filled with milk to which starter and rennet have been added. To that end, the central shaft is driven for rotation, so that the cutting frames move through the curd formed. The cutting frames are usually designed such that the knives and the frame girders form a cutting edge along one edge and are blunt and rounded off along the other edge. Accordingly, rotation of the central shaft(s) in one direction substantially yields a cutting action, while rotation in the other direction substantially yields a stirring action.

A problem presenting itself in the known apparatuses is that they comprise many welds, which must all be polished very well to prevent accumulation of contaminants and bacterial growth. The longitudinal knives can be arranged, for instance, with interspaces of the order of 4 to 5 cm and the transverse knives with interspaces of, for instance, 14.5 to 17.5 cm. A cutting frame can, for instance, have a total width of the order of 50 cm and a length of, for instance, 150 cm. This means that a single cutting frame can comprise, for instance, about 100 rectangular lattice openings, each having four corners where a longitudinal knife or a frame girder is welded to a transverse knife. Each of those welds not only needs to be provided, but also needs to be accurately polished to satisfy the requirements set by government regulations with regard to cleanability. For the welding operation, and in particular also for the polishing operation, however, little space is available within the lattice openings formed by the longitudinal and transverse elements of a cutting frame. As a consequence, the welding work and the polishing work are very time consuming and costly.

In the past, it has been proposed to make the cutting frames of detachable design to obtained a better cleanability. A major drawback of such a solution is that each time a curd vat is to be cleaned, time consuming and cumbersome dismounting activities are necessary.

Accordingly, there is a need for an apparatus of the above-described kind, having a construction such that the necessary welling and polishing work is considerably reduced and simplified, while yet an effective cutting and stirring action and an excellent cleanability remain guaranteed.

According to the invention, to that end, an apparatus for cutting and stirring curd, comprising a curd vat with a shaft drivable for rotation, which shaft carries a number of cutting frames extending radially from the shaft and mounted on the shaft in staggered relation, each cutting frame having frame girders which extend radially from the drivable shaft and between which a lattice work is situated formed from longitudinal knives and transverse knives, the transverse knives being mounted on the frame girders by welding, is characterized in that the transverse knives form openings which are in line, in which the longitudinal knives are received with ample play, and means are provided to substantially prevent displacement of the longitudinal knives in the longitudinal direction.

In the following, the invention will be further described with reference to the accompanying drawings.

Figure 7:
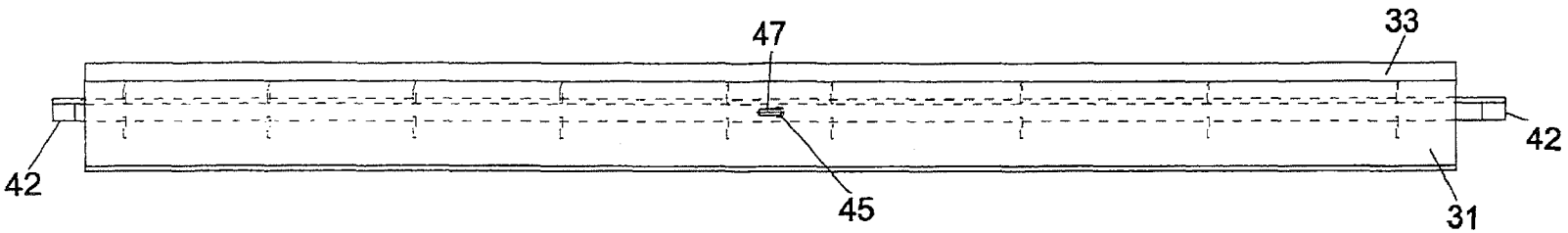
Figure 9:
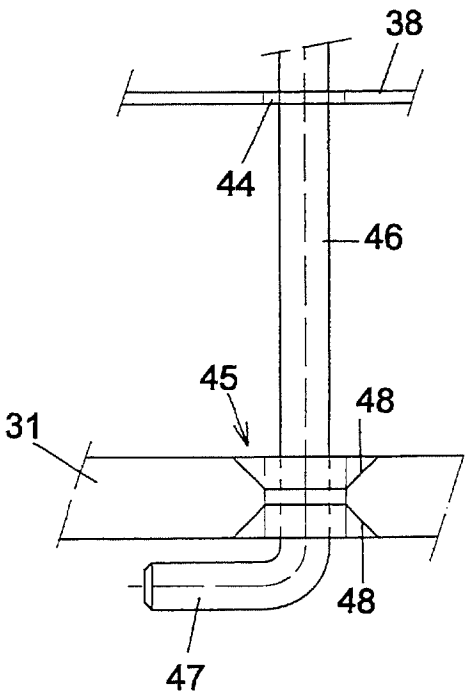
Figure 8:
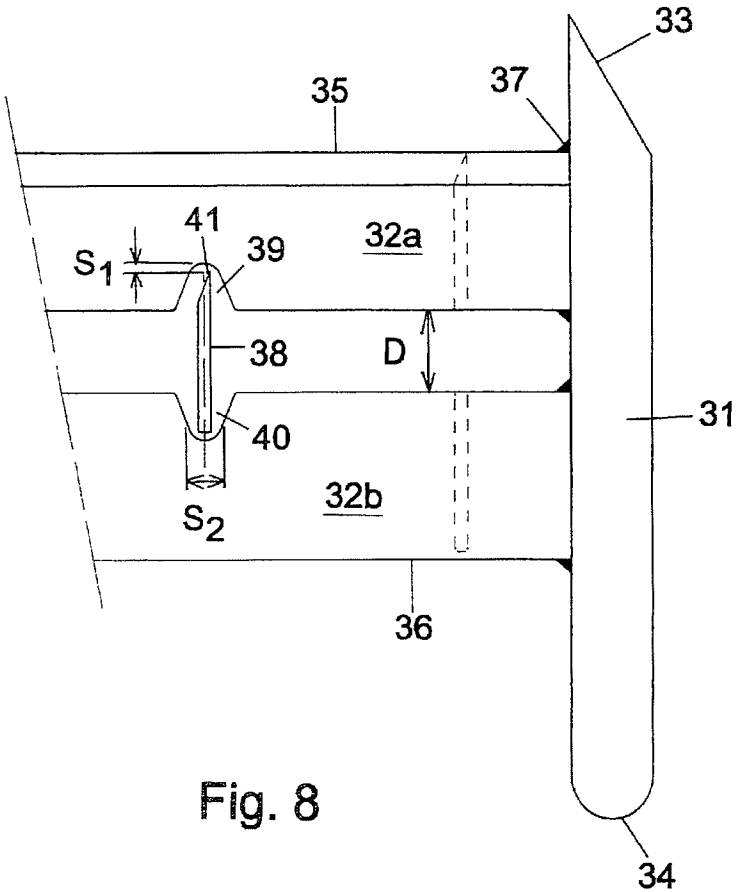
Figure 13:
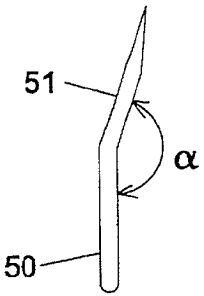
Figure 12:
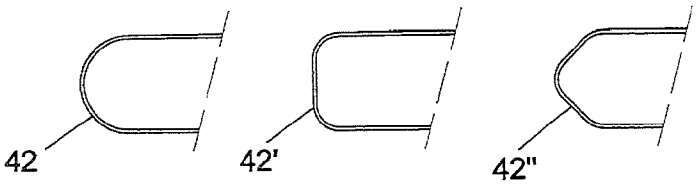
Figure 10:
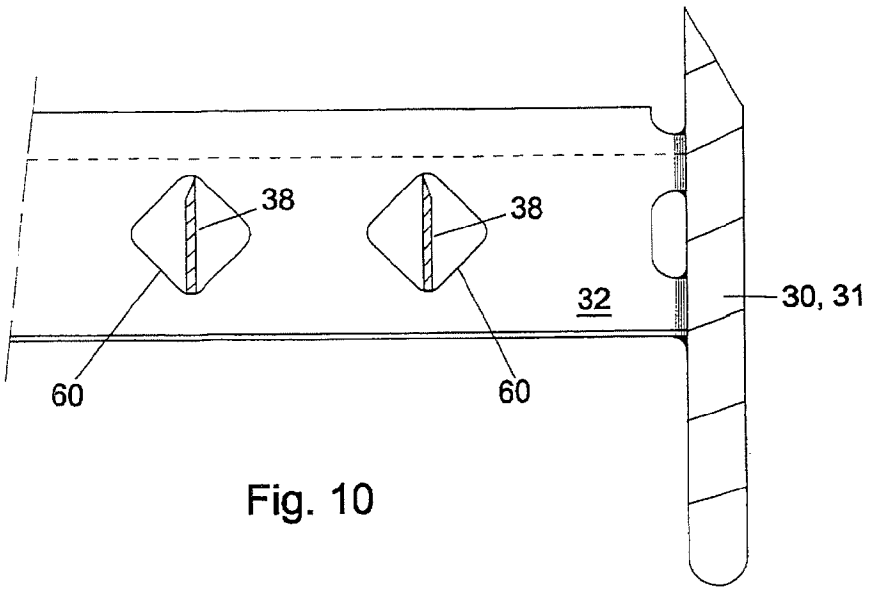
Figure 11:
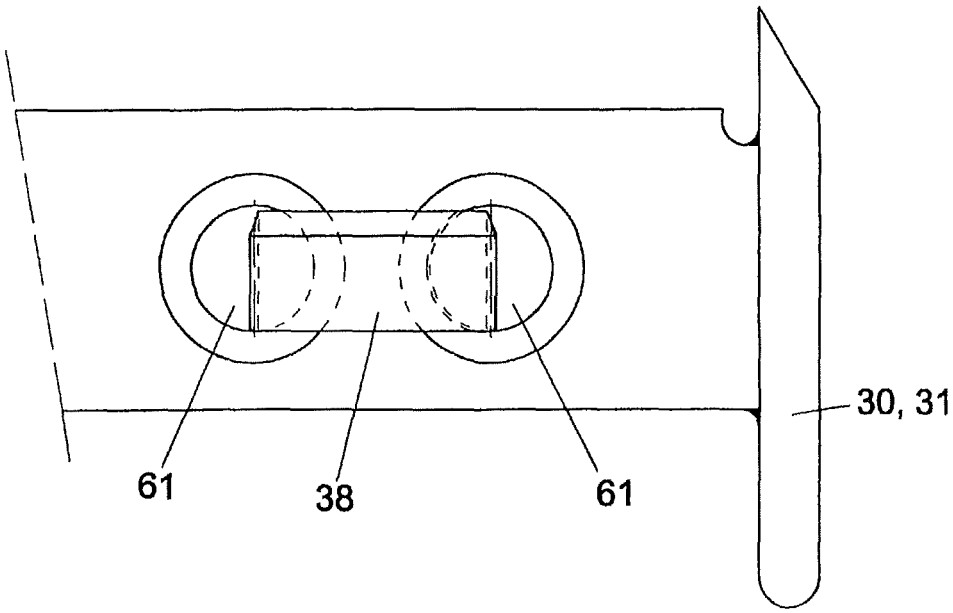
Figure 14:
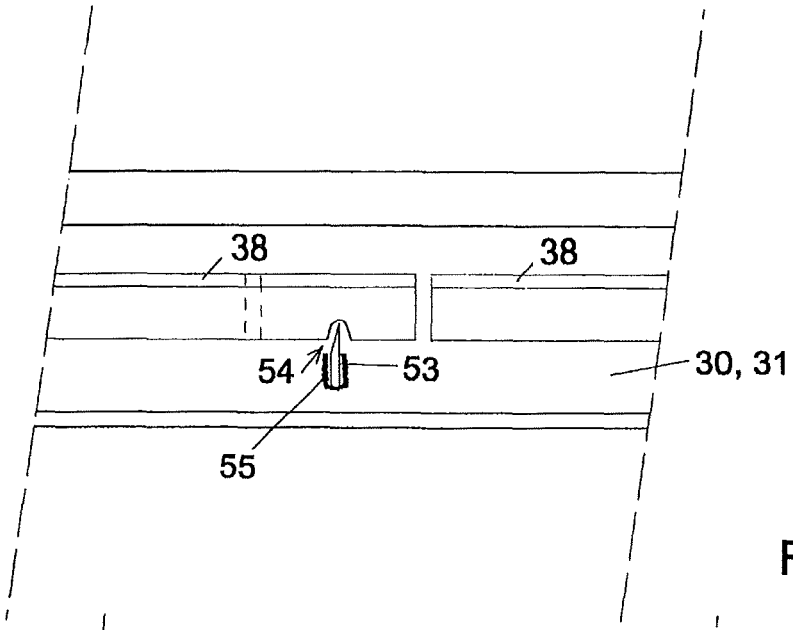
Figure 15:
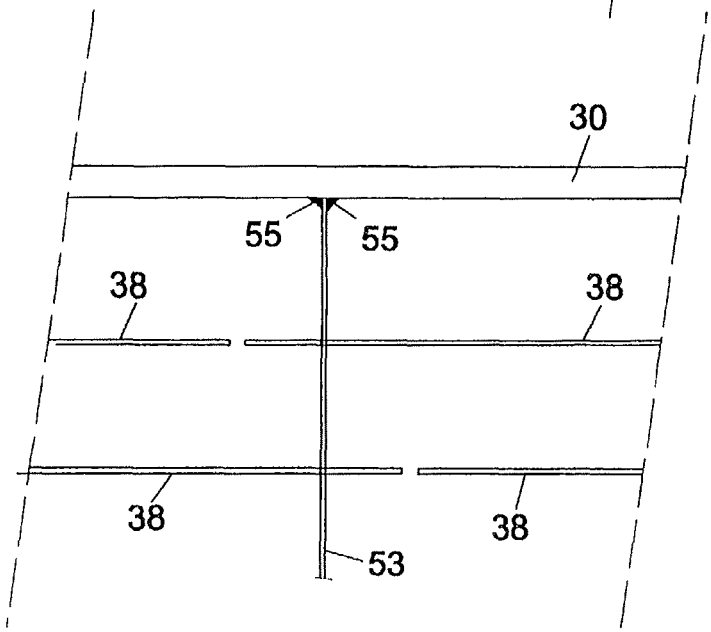
Figure 16:
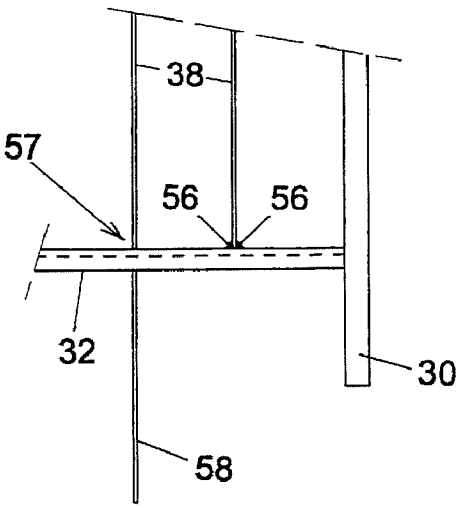
Figure 17:
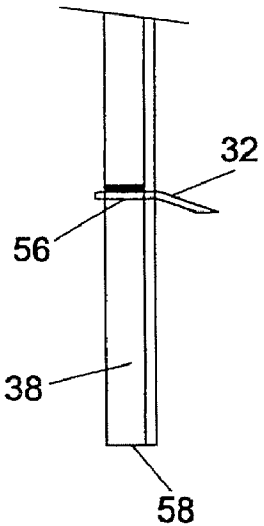
Figure 18:
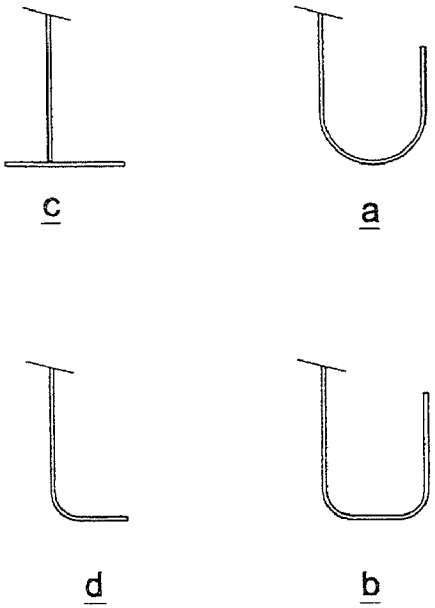

FIG. 1 schematically shows in longitudinal cross section an example of a known apparatus for cutting and stirring curd;

FIG. 2 schematically shows the apparatus of FIG. 1 in cross section;

FIG. 3 schematically shows in top plan view an example of a known cutting frame for an apparatus for cutting and stirring curd;

FIG. 4 schematically shows an end view of the cutting frame of FIG. 3;

FIG. 5. schematically shows a section along the line V—V in FIG. 3;

FIG. 6 schematically shows a top plan view of an example of a cutting frame according to the invention;

FIG. 7 schematically shows a side elevation of the cutting frame of FIG. 6; and FIG. 8 schematically shows a cross section along the line VIII—VIII in FIG. 6;

FIG. 9 shows a detail of the cutting frame of FIG. 6;

FIGS. 10 and 11 schematically show examples of the manner in which a transverse knife of a cutting frame according to the invention can receive a longitudinal knife;

FIG. 12 schematically shows a few examples of shapes of a bent longitudinal knife;

FIG. 13 schematically shows an example of a bent transverse knife;

FIGS. 14 and 15 schematically show in side elevation and top plan view an example of a fixing method for a longitudinal knife;

FIGS. 16 and 17 schematically show in top plan view and side elevation an example of an alternative fixing method for a longitudinal knife; and FIG. 18 schematically shows in top plan view a few examples of shapes of the free end of a longitudinal knife.

FIGS. 1 and 2 represent a known cylindrical horizontally arranged curd vat 1 which is supported by a number of legs 2. The end walls 3, 4 of the curd vat 1 are conical in this example and through one of these end walls a shaft 5 extends centrally into the curd container. This shaft, which in this example is journaled in the opposite end wall, supports a tool 6 for cutting and stirring curd in the curd container. Numeral 7 designates a sealing element between the shaft 5 and the wall 3, through which the shaft 5 extends into the curd container.

Outside the curd container, the shaft 5 is connected by means of a coupling 8 to a shaft 9, which is connected, in most cases coupled directly via transmission means 10, to a drive motor 11. The motor 11 is arranged for rotating the tool 6 around the centerline of the curd vat 1 alternately in one direction and the other.

In this example, the curd vat 1 in its upper part has a manhole 13 which is covered by a manhole cover 13a. In this example, further, another opening is provided in the upper part of the curd container 1, which opening is designated by 14 and is intended for the immersion of a whey sieve 15 in the curd container 1. The whey sieve 15 in this example is supported by a bent pipe 16 which at 17 is rotatably connected to the curd container 1. The curd vat 1 has an outlet 18 at its lowest part. A triangle P indicates a usual level of the curd in the curd vat. It is noted that the invention is also applicable to differently designed curd vats.

The tool 6 comprises a number of cutting frames 19 which are located side by side along the shaft 5, as appears from FIG. 1. In the illustrated embodiment, the tool consists of six sections. The number of sections is dependent on the size of the tank. The sections are connected to the shaft, such that they form angles with each other, as can be seen in FIG. 2. In the illustrated embodiment, the sections are placed along the shaft 5 so as to extend outwards from the shaft in a helical configuration.

Each of the sections may further be fitted at an angle to the shaft 5, as illustrated in FIG. 1 by a broken line 20 indicating the section which is located farthest to the left and is concealed by the shaft 5.

FIGS. 3 and 4 schematically show in top plan view and end view an example of a known cutting frame 19, as can be used, for instance, in the apparatus of FIGS. 1 and 2. The known cutting frame comprises two parallel frame girders 21, between which transverse knives 22 extend transversely to the longitudinal girders 21, which transverse knives 22 are welded to the frame girders. Extending transversely to the transverse knives 22 and parallel to the frame girders are longitudinal knives 23, which are welded to the transverse knives. The longitudinal girders, the transverse knives and the longitudinal knives are provided, on one longitudinal edge thereof, with a cutting edge 24, and 25 (FIG. 5), all situated on the same side with respect to the cutting frame. The other longitudinal edge in each case is blunt and typically of rounded design. The sharp teeth serve for cutting the curd in one rotational direction of the shaft 5 and the blunt edges serve for stirring the curd in the other rotational direction.

It is noted that in FIG. 3 the longitudinal knives are longer than the frame girders. In reality, however, the frame girders, at least on the side of the rotatable shaft 5, whose axis is indicated in FIG. 3 at 27, either extend as far as the rotatable shaft or are connected with the rotatable shaft through suitable extension pieces adapted, for instance, for receiving the free ends of the frame girders.

FIG. 5 schematically shows a cross section along the line V—V in FIG. 3. Indicated at 28 and 29 are the welds between the transverse knives and the longitudinal knives, and between the frame girders and the transverse knives, respectively. Each lattice opening of the lattice shown in FIG. 3, formed by the transverse and longitudinal knives and the frame girders, comprises four welds, which are all to be polished to remove cavities and roughnesses. Nor should the welds exhibit any cracks. Providing and finishing these welds is a highly labor intensive, cumbersome and costly work, as has already been set out in the foregoing.

FIG. 6 schematically shows in top plan view an example of a cutting frame for an apparatus according to the invention, and FIG. 7 schematically shows a side view of the cutting frame of FIG. 6, and FIG. 8 is cross-section taken on line VIII—VIII in FIG. 6. The cutting frame shown can be mounted, in a manner similar to the known cutting frames, on a central rotatable shaft 5, the centerline 27 of which is indicated in FIG. 6. The cutting frame shown again comprises two substantially parallel frame girders 30, 31, between which extend knives 32 in transverse direction. The frame girders again have a sharp cutting edge 33, which is situated on the upper side in FIG. 7, and a blunt, in this example rounded, lower edge. The transverse knives 32 also have corresponding cutting edges 35 and blunt edges 36. Optionally, however, the transverse knives and/or the longitudinal knives may also have a cutting edge on both sides. The transverse knives are connected at their ends to the frame girders in a conventional manner by welds 37. The transverse knives are further each provided with a series of openings uniformly distributed along the length of the transverse knives. [Mach] *Each* opening of a transverse knife is in register with corresponding openings of the other transverse knives, and the openings are so designed that a longitudinal knife can be slid into them. The longitudinal knives are loosely disposed in the openings with a relatively large play. This prevents accumulation of curd material at the intersections of transverse and longitudinal knives and provides for good cleanability. The longitudinal knives, therefore, are not fixedly connected to the transverse knives and can be assembled in a simple manner by sliding them into the openings of the transverse knives. Subsequently, the longitudinal knives are jointly secured with one or more transverse pins in a manner yet to be described, or in a different manner.

The openings in the transverse knives can have various shapes, for instance a circular, oval, rectangular or diamond-shaped shape. The edges of the openings, or at least the lower portion thereof, can be provided with cutting edges. Advantageously, the upper edges, or all edges, of the openings may also be sharp so as to obtain a smallest possible contact surface and a smallest possible risk of dirt incrustation.

Examples of receiving openings for a longitudinal knife as provided in a transverse knife are schematically shown in FIGS. 10 and 11, each showing two side-by-side openings 60 and 61, respectively, in which a U-shaped bent longitudinal knife 38 is received.

To enhance strength, the transverse knives can optionally have a curved or bent shape, as viewed in cross section, as shown schematically in FIG. 13. The transverse knife shown in cross section has a lower part 50 and an upper part 51, which include an angle $\alpha$ of, for instance, 160° or 170°.

In the exemplary embodiment schematically shown in FIGS. 7 and 8, there are used two rows of transverse knives or transverse elements 32a, 32b placed above each other with an interspace D, two transverse knives or transverse elements located above each other jointly forming a complete transverse knife. The upper transverse knife 32a has an upper cutting edge 35. The lower transverse knife 32b in the example shown does not have a cutting edge at the top, but could have one, if desired. Further, both transverse knives of each set in this example are blunt on the lower side. The designations upper side and lower side are related to FIG. 8 and respectively indicate the leading and trailing side during the cutting of the curd. The distance D between the transverse knives located above each other is less than the height of the longitudinal knives 38. To enable the longitudinal knives to be received and locked against lateral displacement, there are provided in the transverse knives series of opposite recesses 39, 40 which in the example shown in FIG. 8 have approximately the shape of a truncated triangle. Two opposite openings can jointly receive a longitudinal knife 38. The cutting edge 41 of the longitudinal knives is turned upwards in FIG. 8. The longitudinal knife has some possibility of movement within the opening 39, 40 both in vertical direction and in horizontal direction, as indicated by S1 and S2 in FIG. 8. The longitudinal knives in the example shown are formed as U-shaped bent strips having legs of unequal length. The U-shaped strips are in each case slid into the openings in the transverse knives from the two ends of a cutting frame, with the legs of the U-shape ending up in successive openings. The bent part of the U-shapes is indicated in FIG. 6 by 42. The bent part 42 can have various shapes, taking the form of, for instance, a round bend, a pointed bend, or a fairly right-angled bend, as schematically shown in FIG. 12 at 42, 42', 42". Further, in each case, a long leg of a U-shaped longitudinal knife inserted from one side comes to lie in line with a short leg of a U-shaped longitudinal knife inserted from the other side. The long legs of the U-shaped longitudinal knives then overlap in an overlap area 43, which, when the longitudinal knives are substantially identically shaped, is located halfway the length of a cutting frame. Referring to FIG. 9, in the long legs, adjacent the free ends and in the overlap area, openings 44 are provided, which are in register with each other and with corresponding openings 45 in the frame girders. Inserted through these registered openings is a pin 46, whose ends 47 have subsequently been bent over so that the pin cannot slip from the cutting frame anymore. One of the ends may have been bent over beforehand. The diameter of the openings in the longitudinal knives and the frame girders is greater than the cross section of the pin 46, thereby preventing the possibility of material adhering in and around the openings. The openings in the frame girders are preferably designed to flare on both sides, as shown at 48, because the frame girders are relatively thick. In this way, narrow gaps between the pin and the frame girders are avoided. Optionally, this technique can also be followed for the openings in the longitudinal knives, but in view of the minor thickness of the longitudinal knives, this is normally not necessary.

The above-described construction of a cutting frame enables a relatively simple assembly of the cutting frame with relatively little welding work. Also, by virtue of the nature of the construction with the longitudinal knives mounted in the cutting frame with relatively large play, caking of dirt at the intersections of the longitudinal and transverse knives and adjacent the fixing pin 46 can be effectively prevented.

It is noted that after the foregoing, various modifications will readily occur to those skilled in the art. Thus, as already noted, it is possible to use, at will, single relatively broad transverse knives with an opening therein for the longitudinal knives or pairs of two transverse knives located above each other with recesses located opposite each other. It is also possible to use long U-shaped knives extending substantially throughout the length of a cutting frame, which are optionally fitted in alternation from one end of the cutting frame and from the other end. Further, instead of longitudinal knives bent into a U-shape, straight longitudinal knives having the same length as the cutting frame can be used. It is also possible to use shorter knives which can overlap to allow them to be fixed with a single fixing pin. Alternatively, more than one fixing pin, for instance two, can be used. This also holds if the U-shaped bent longitudinal knives are designed with legs of equal length. Furthermore, when U-shaped longitudinal knives are used, it is, of course, possible to make the legs as long as the cutting frame. Then a single fixing pin will suffice again.

The fixing pin shown in the figures has two bent ends, which means that at least one end has to be bent over after the pin has been placed. Alternatively, other fixing methods are conceivable, such as, for instance, welding the pin to one or both frame girders, or the use of a pin consisting of two parts, which parts, after being arranged at an appropriate position between the frame girders, are attached to each other by screws or welds or the like.

Further, the longitudinal knives can be provided with recesses instead of openings, which recesses receive, with play, a fixing pin which prevents the longitudinal knives from shifting in their longitudinal direction. Instead of a fixing pin inserted through openings, a special transverse knife or transverse element may then be used, which extends in the recesses and which, after positioning of the longitudinal knives, is welded to the frame girders of the cutting frame. Such a fixing method is schematically shown in FIGS. 14 and 15. A transverse element 53 reaches in the recesses 54 on the lower side (or upper side) of a number of longitudinal knives 38 and is mounted by its ends to the frame girders 30, 31 of the cutting frame, in this example by welding, as designated at 55.

According to another alternative, the longitudinal knives can be connected at one of their ends to a transverse knife or a special transverse element by welding. FIG. 16 and FIG. 17 show such a fixing method, in this example used for U-shaped bent longitudinal knives of a length substantially corresponding to that of the cutting frame and with legs which are not equally long. This fixing method, however, can also be used for shorter longitudinal knives and/or non U-shaped bent longitudinal knives and/or U-shaped bent longitudinal knives with legs of equal length, while depending on the selected configuration one or both legs of a U-shaped longitudinal knife can be fixed by welding.

FIG. 16 shows in top plan view a part of a cutting frame with a U-shaped bent longitudinal knife 38 with unequal legs. The end of the shorter leg is connected at 56 by welding to the last transverse knife 32 or to a transverse element especially arranged for that purpose. The other leg in this example reaches through an opening in the transverse knife, indicated by an arrow 57. The opening can be formed in any one of the manners already described hereinbefore. As can be seen in the side elevation of FIG. 17, in this example the transverse knife 32 is a bent transverse knife, to enhance stiffness.

The free end 58 of the long leg of the longitudinal knife that reaches beyond the transverse knife or transverse element can, if desired, be bent over or be provided with a transverse section, as shown in FIG. 18 by way of example at a, b, c and d.

These and similar modifications will readily occur to those skilled in the art.

What is claimed is:

1. An apparatus for cutting and stirring curd, comprising a curd vat with a shaft drivable for rotation, which shaft carries a number of cutting frames extending radially from the shaft and arranged on the shaft in staggered relation, each cutting frame having two frame girders, which extend radially from the drivable shaft and between which a lattice work is situated formed from longitudinal knives and transverse knives, the transverse knives being mounted on the frame girders by welding wherein the transverse knives have openings which are in line, in which the longitudinal knives are received, while means are provided for substantially preventing displacement of the longitudinal knives in the longitudinal direction and wherein [at least a number of said opening are of essentially circular or oval shape] *each longitudinal knife has a size relative to the size of the openings such that the longitudinal knives are loosely disposed in the openings with a relatively large play*.

2. An apparatus as claimed in claim 1, wherein at least a number of said openings are of diamond shape.

3. An apparatus as claimed in claim 1, wherein at least a number of transverse knives, viewed in cross-section have a bent shape.

4. An apparatus as claimed in claim 1, wherein the means for preventing displacement of the longitudinal knives comprise a transverse knife which is secured to both frame girders and which is connected to the longitudinal knives[through welding].

5. An apparatus as claimed in claim 4, wherein said transverse knife has a bent shape in cross-section.

6. An apparatus as claimed in claim 1, wherein the longitudinal knives include a number of U-shapes bent strip like knives, the legs of said U-shaped knives being inserted in adjacent openings of the transverse knives.

*7. A cutting frame comprising: a pair of parallel girders, the girders being spaced apart and having a plurality of transverse knives extending transversely between the girders and secured to the girders by welding, the transverse knives having a cutting edge extending transversely of the girders and the transverse knives having a plurality of openings, the openings in one of the transverse knives being aligned with openings in adjacent transverse knives, longitudinal knives each having a longitudinal cutting edge, the longitudinal knives extending through the openings in the transverse knives, the openings being larger in size than the longitudinal knives, the longitudinal knives having means for preventing the longitudinal knives from longitudinal movement.*

*8. The cutting frame according to claim 7, wherein the longitudinal knives have openings, and wherein the girders have openings aligned with the openings in the longitudinal knives, and wherein the means for preventing the longitudinal knives from longitudinal movement relative to the transverse knives comprises a pin extending through the longitudinal knives openings and through the girder openings that are aligned with the longitudinal knives openings.*

*9. The cutting frame according to claim 8, wherein each opening in the longitudinal knives is of a size relative to the cross-section of the pin to provide space in the openings around the pin.*

*10. A cutting frame comprising: a pair of parallel girders, the girders being spaced apart and having a plurality of transverse knives extending transversely between the girders and secured to the girders by welding, the transverse knives having a cutting edge extending transversely of the girders and the transverse knives having a plurality of openings, the openings in one of the transverse knives being aligned with openings in adjacent transverse knives, longitudinal knives extending through the openings in the transverse knives, the longitudinal knives being loosely disposed in the openings with a relatively large play, and means for substantially preventing displacement of the longitudinal knives in the longitudinal direction.*

*11. The cutting frame according to claim 10, wherein the longitudinal knives have a leading side having a longitudinal cutting edge and a trailing edge, and each opening has a size greater than the size of each longitudinal knife, the openings comprising recesses aligned with the longitudinal knives and having the leading and trailing edges received in the recesses.*

*12. A cutting frame comprising:*

*a pair of girders, said girders being spaced apart from each other and having a plurality of transverse knives extending between the girders, the transverse knives being connected to the girders by welding,*

*a plurality of longitudinal knives arranged in substantially parallel relation to the girders and being spaced apart from each other, the longitudinal knives being secured against longitudinal displacement relative to the girders,*

*the transverse knives having a plurality of openings, the openings in each transverse knife being in register with corresponding openings of others of the transverse knives and through which the longitudinal knives pass, each longitudinal knife comprising two legs connected by a part.*

*13. The cutting frame according to claim 12, wherein the part has a "U" shape.*

*14. The cutting frame according to claim 13, wherein the part is a bent part joining an adjacent pair of the longitudinal knives of unequal length.*

*15. An apparatus as claimed in claim 1 wherein at least a number of the openings are essentially circular.*

*16. An apparatus as claimed in claim 1 wherein at least a number of the openings are oval shape.*

*17. An apparatus as claimed in claim 1, wherein the means for substantially preventing displacement of the longitudinal knives in the longitudinal direction comprises one end of the longitudinal knives being welded to one of the transverse knives.*

*18. An apparatus as claimed in claim 7, wherein the means for preventing the longitudinal knives from longitudinal movement comprises one end of the longitudinal knives being welded to one of the transverse knives.*

*19. An apparatus as claimed in claim 10, wherein the means for substantially preventing displacement of the longitudinal knives in the longitudinal direction comprises one end of the longitudinal knives being welded to one of the transverse knives.*

* * * * *